United States Patent [19]
Voit et al.

[11] Patent Number: 5,332,187
[45] Date of Patent: Jul. 26, 1994

[54] ADJUSTING ARRANGEMENT

[75] Inventors: Arno Voit, Hausham; Franz Sperber, Kolbermoor, both of Fed. Rep. of Germany

[73] Assignee: Deutsche Aerospace AG, Fed. Rep. of Germany

[21] Appl. No.: 63,312

[22] Filed: May 19, 1993

[30] Foreign Application Priority Data

Jun. 24, 1992 [DE] Fed. Rep. of Germany ....... 4220634

[51] Int. Cl.$^5$ .............................................. F16M 3/00
[52] U.S. Cl. ................... 248/659; 74/479 P; 343/765; 343/766
[58] Field of Search ............... 248/659, 652, 651, 649, 248/660, 662, 662, 663, 664, 666, 667; 74/479 P, 479 M; 343/765, 766

[56] References Cited

U.S. PATENT DOCUMENTS

| | | | |
|---|---|---|---|
| 2,901,208 | 8/1959 | Jones | 343/765 X |
| 4,669,699 | 6/1987 | Kaneko | 248/644 X |
| 4,953,422 | 9/1990 | Chapman et al. | 248/661 X |

FOREIGN PATENT DOCUMENTS

| | | | |
|---|---|---|---|
| 0574601 | 1/1982 | Japan | 343/765 |
| 806889 | 1/1959 | United Kingdom . | |

*Primary Examiner*—Ramon O. Ramirez
*Attorney, Agent, or Firm*—Evenson, McKeown, Edwards & Lenahan

[57] ABSTRACT

An arrangement is provided for the adjusting of a mounting part on a carrier in a statically determined position which can be adjusted in a rotatory and translatory manner in three axes with respect to the carrier. The arrangement comprises at least three adjusting units which are arranged in an offset manner with respect to one another between the carrier and the mounted part, each of which comprises two connecting parts which can be translatorily adjusted relative to one another in two axes and are constructed to be rotatorily in three axes as well as translatorily in one axis freely movable sloped to the adjusting plane of the connecting parts. The two connecting parts are adjustably coupled with one another by a double disk arrangement which comprises a primary disk which is disposed on one connecting part so that its rotating position can be adjusted in the adjusting plane of the connecting parts, and a secondary disk which is surrounded by the primary disk in the disk plane, which is disposed on the primary disk so that its rotating position can be adjusted about an axis (B) which is eccentric to the axis of rotation (A) of the primary disk, at which secondary disk the other connecting part is arranged at a distance from the axis of rotation of the secondary disk and is connected with the mounting part via a freely movable combined ball joint slide connection.

20 Claims, 2 Drawing Sheets

ADJUSTING ARRANGEMENT

BACKGROUND AND SUMMARY OF THE INVENTION

This invention relates to an arrangement for adjusting a mounting part on a carrier in a statically determined position which can be adjusted in three axes in a rotatory and translatory manner with respect to the carrier. At least three adjusting units are arranged in an offset manner with respect to one another between the carrier and the mounting part. Each adjusting unit comprises two connecting parts which can be translatorily adjusted with respect to one another in two axes and is constructed to be freely movable rotatorily in three axes and translatorily in one axis in a sloped manner to the adjusting plane of the connecting parts.

In the field of space operations, arrangements of this type are known, e.g., "Space Shuttle Accommodation Handbook", Vol. XIV. The arrangements permit an anchoring of a useful load which can be adjusted in all six degrees of freedom in the load bay of a spacecraft by means of fastening units. The fastening units are arranged in the manner of a three-point suspension and each comprise a combined freely movable ball joint slide connection with slide pins rigidly fastened to the useful load as well as a cross slide arrangement which can be adjusted in a translatory manner in two axes and acts between the ball joint and the load bay wall. Because of their relatively low constructive stiffness, adjusting arrangements of this type must be produced from massive components with a view to a precise fixing of the mounting part in the respective adjusting position. This requires expenditures of space and weight which are unacceptable, particularly in space operations.

It is therefore an object of the invention to construct an arrangement of the above-mentioned type in such a manner that it has a high constructive stiffness and, in a constructionally simple, weight and space saving manner, permits a precise adjusting of the mounting part with positional stability with respect to the carrier.

According to the present invention, this object is achieved by an arrangement for adjusting a mounting part on a carrier in a statically determined position which can be adjusted in three axes in a rotatory and translatory manner with respect to the carrier. At least three adjusting units are arranged in an offset manner with respect to one another between the carrier and the mounting part. Each adjusting unit comprises two connecting parts which can be translatorily adjusted with respect to one another in two axes and is constructed to be freely movable rotatorily in three axes and translatorily in one axis in a sloped manner to the adjusting plane of the connecting parts. The two connecting parts are adjustably coupled with one another in two axes by means of a double disk arrangement. The double disk arrangement comprises a primary disk which is disposed in the adjusting plane of the connecting parts on one connecting part so that the rotating position can be adjusted, add a secondary disk which is enclosed by the primary disk and is disposed so that its rotating position on the primary disk can be adjusted about an axis (B) which is eccentric to its axis of rotation (A). The other connecting part is arranged on the secondary disk at a distance (a) from the axis of rotation (B) of the secondary disk.

According to the present invention, the adjusting movements of the mounting part in all six degrees of freedom are caused exclusively by rotationally positionable disk elements which interact with one another in pairs. Because of the homogeneous inherent stiffness which is high in the direction of their surface dimension and because of their arrangement in the adjusting plane of the connecting parts, the disk elements ensure a highly load-stable coupling of the mounting part and the carrier and an extremely flat construction with low expenditures of space and weight consisting of a few structural elements which are easy to manufacture, with the additional kinematic advantage that, in the case of a rotation of the disk elements without any reversal of the rotating direction automatically, a reversing translatory adjusting movement takes place between the connecting parts of the individual adjusting units.

With a view to an additional constructional simplification and load-stable bearing, the primary and the secondary disk of the double disk arrangement are preferably, by means of a bearing device which in each case surrounds the outer circumference of the disks in a ring-shaped manner, arranged to be mutually rotatable or rotatable on the one connecting part. The bearing points which surround the outer edge of the disks are expediently constructed to be form-locking on both sides, whereby the stiffness and the adjusting precision of the double disk arrangement are increased further. For the same reason, the primary and the secondary disk are preferably arranged in a coplanar manner with respect to one another.

In order to be able to adjust the connecting parts relative to one another on any arbitrary point within an area of a complete circle by means of the rotational disk arrangement, it is recommended to select the distance between the axis of rotation of the secondary disk and the connecting part arranged on it essentially of the same size as the eccentricity between the axes of rotation of the disks.

In order to be able to use the double disk arrangement several times for adjusting purposes, this double disk arrangement can be removed preferably in the adjusting condition and can be exchanged for an end-mounted fastening unit which is manufactured with precise measurements according to the relative position of the connecting parts.

However, in a particularly preferred development of the invention, the adjusting units remain between the mounting part and the carrier for the final fastening, in which case the double disk arrangements are non-rotatably locked in the adjusting position. The locking is very advantageously constructed to be releasable so that in the mounted condition, the double disk arrangements permit a readjusting of the mounting part with respect to the carrier. In a particularly preferred manner, the double disk arrangements are driven by a motor so that, the rotating positions can be adjusted and so that the adjusting units, without any problems, can be adjusted and readjusted in a remote-controlled manner in a mounting position that is difficult to access as well as by radio, for example, in orbit.

With a view to a particularly space-saving construction that is easy to manufacture, the one connecting part is preferably fastened directly on the carrier in a rigid manner, while the other connecting part is constructed as a combined ball joint slide connection with a sliding pin which is rigidly fastened on the mounting part.

The slide shafts of the individual adjusting units which are in each case provided for the free translatory movement are expediently aligned with a common intersecting point, whereby in a very simple manner a suspension of the mounting part on the carrier is achieved that is free of thermal stress.

Because of the relationship between the rotating position changes of the individual primary and secondary disks which kinematically is generally complicated and because of the resulting rotatory and translatory movements of the mounting part in a reference system of coordinates fixed on the carrier, it is finally recommended to correlate the rotating position adjusting movements of the primary and secondary disks of the adjusting units in a computer-assisted manner.

Other objects, advantages and novel features of the present invention will become apparent from the following detailed description of the invention when considered in conjunction with the accompanying drawings.

DETAILED DESCRIPTION OF THE DRAWINGS

Figure 1:
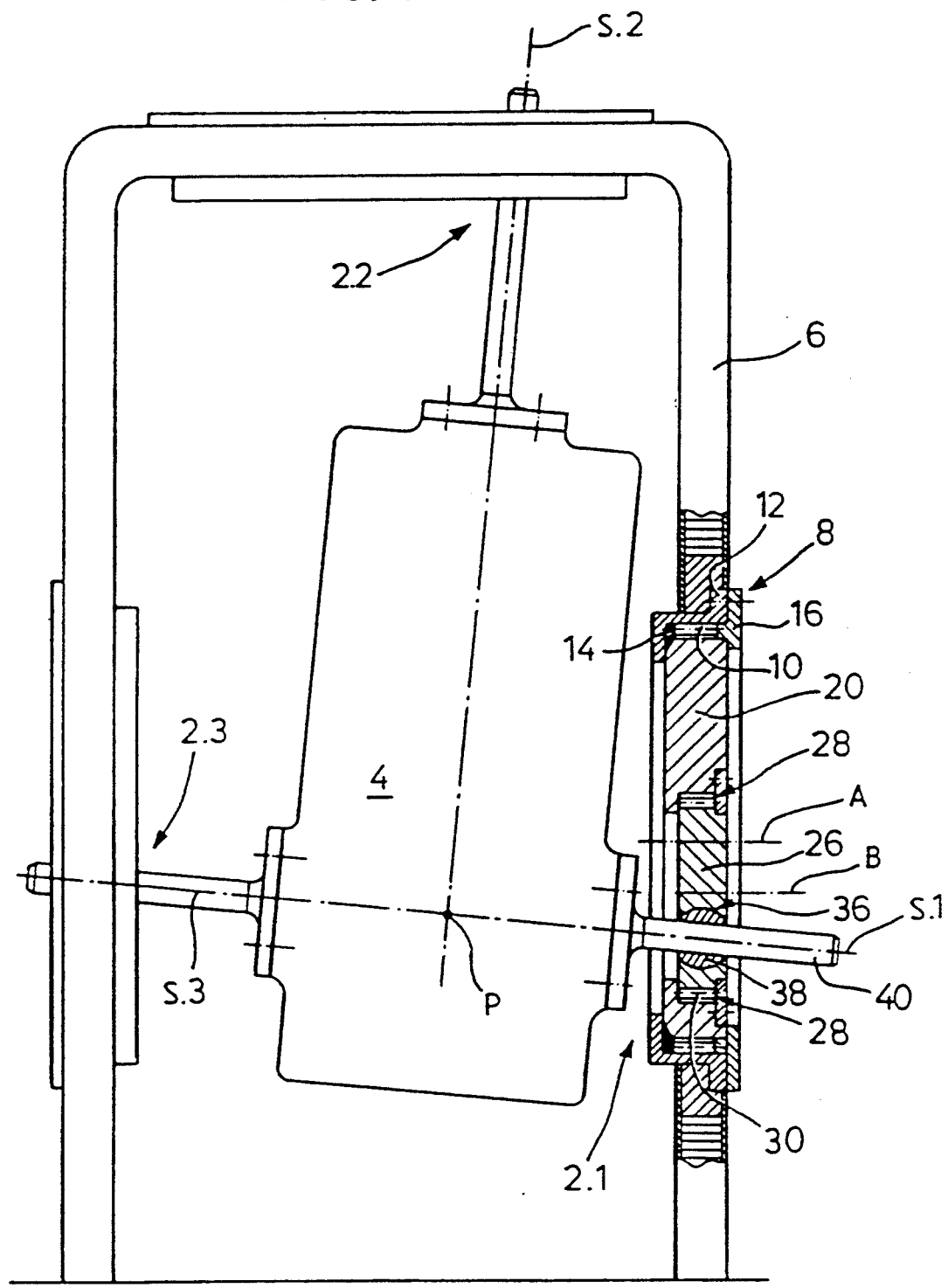
FIG. 1 is a schematic representation of a partially cut view of an adjusting arrangement consisting of three adjusting units arranged between the mounting part and the carrier.
Figure 2:
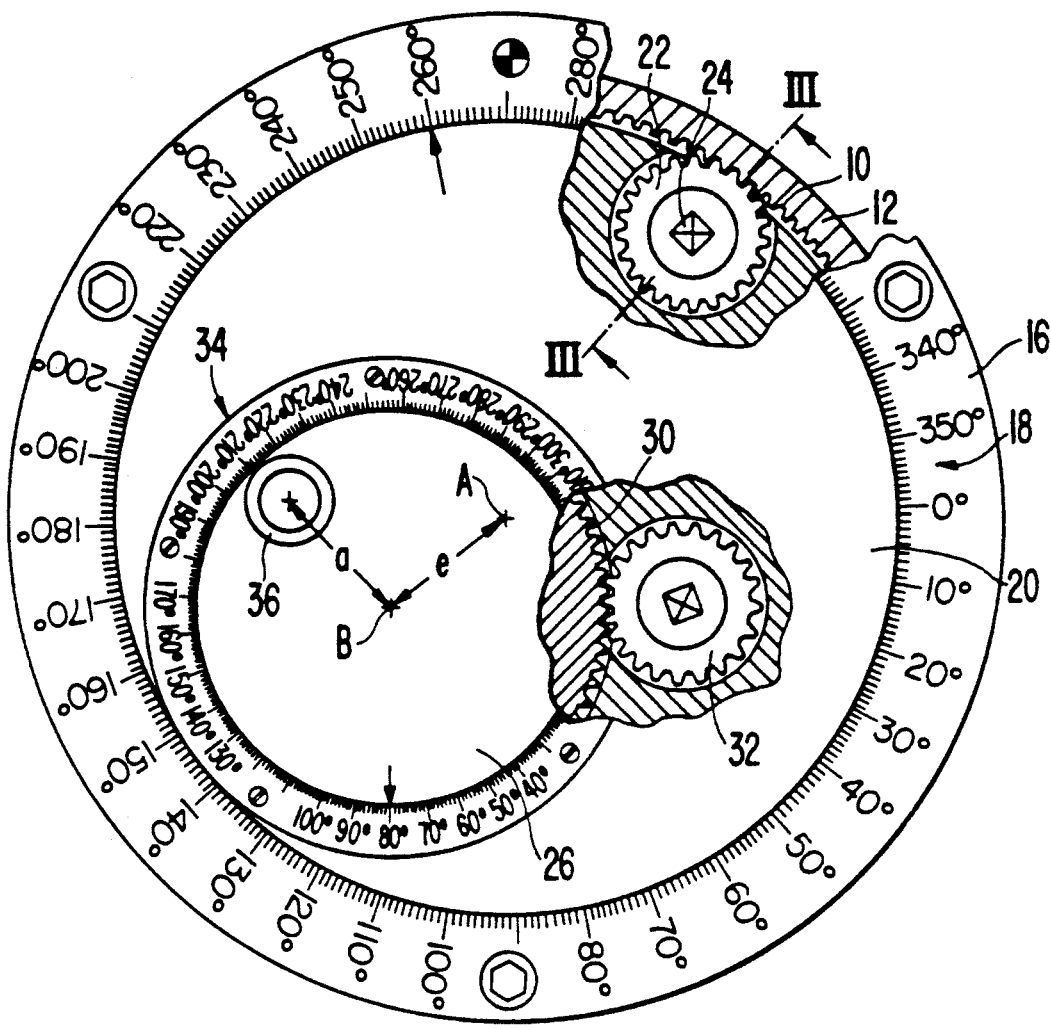
FIG. 2 is a schematic representation of a top view of one of the double disk arrangements.

FIG. 1 illustrates an adjusting arrangement comprising three adjusting units 2.1, 2.2 and 2.3, by way of which a mounting part 4, such as the plate-shaped base of an antenna supply unit, is suspended in a statically determined position so that it can be adjusted rotatorily and translatorily in three axes on a rigid carrier 6, for example, of the carrying structure of a reflector antenna designed in a sandwich construction.

Each adjusting unit 2 comprises a connecting part 8 which is rigidly connected, for example, screwed together with the carrier structure 6, and consists of a cup-shaped ring flange 12 which is provided with an internal toothing 10 and has a divided bearing ring 14 as well as a ring-shaped bearing cap 16. The bearing cap 16 has an angular degree scale 18 and forms a pivot bearing for a circular primary disk 20. By means of the pivot bearing, the disk 20 is disposed on the outer edge coplanar to the carrier structure 6 rotatably about the central disk axis A and perpendicular to the disk plane on both sides along the whole outer circumference of the disk in a form-locking manner o% the connecting part 8 and on the carrier structure 6.

Figure 3:
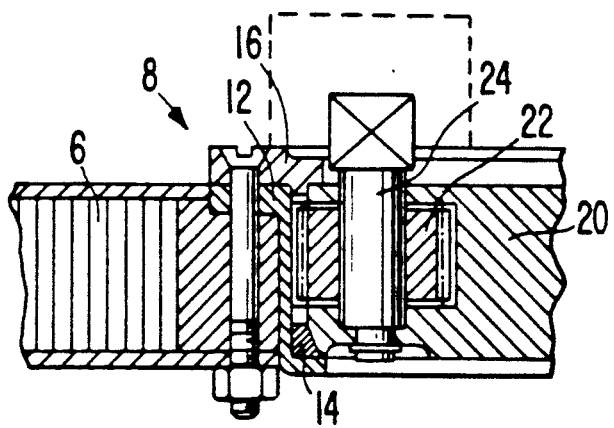
FIG. 3 is a schematic representation of a sectional view taken along line III—III of FIG. 2.

For adjusting the primary disk 20 to a rotating position that can be read by means of the scale 18, a pinion 22 (FIG. 3) is used which is disposed on the disk body. The pinion 22 mates with the internal toothing 10 of the ring flange 12 and has a pinion shaft 24 that can be rotated manually, but preferably by means of the motor drive indicated by an interrupted line in FIG. 3. The primary disk 20 is protected from unintentional changes of the rotating position with respect to the connecting part 8 under load by a frictional engagement or another locking (not shown) which can be selectively released by actuating the pinion 22.

A circular secondary disk 26 is arranged in a coplanar manner with respect to the disk plane in a corresponding recess within the outer circumference of the primary disk 20. In the same manner as the primary disk 20 is disposed on the connecting part 8, i.e., by means of a pivot bearing 28 reaching around the outer circumference of the secondary disk 26, the secondary disk 26 is disposed on the primary disk 20. The secondary disk 20 is disposed rotatably about the central disk axis B which extends at a distance "e" eccentrically with respect to the axis of rotation A and in a form-locking manner in both sides. The secondary disk 26 is provided with an external toothing 30 and, by way of a pinion 32 disposed on the primary disk 20 and preferably again driven by a motor, can be adjusted to a rotating position with respect to the primary disk 20 which can be read on the angular degree scale 34.

At a distance "a" from the secondary disk axis B, which is approximately as large as the eccentricity "e" of the axis, a second connecting part 36 in the form of a ball socket is disposed on the secondary disk 26. The ball socket, together with the spherical part 38 interacting with it, forms a freely angularly movable socket joint for a sliding pin 40 which axially can be freely slid in the spherical part 38. The slide pin 40 is rigidly fastened to the mounting part 4. The sliding pins 40 of the individual adjusting units 2 are positioned on the mounting part 4 in such a manner that their sliding axes S.1, S.2 and S.3 are in each case offset with respect to one another by approximately 90° and have a common intersecting point P.

By means of a change of the rotating position of the primary and/or secondary disks 20, 26, each connecting part 36 can be adjusted with respect to the assigned connecting part 8 in the plane of the double disk arrangement 20, 26 in two axes in a translatory manner to any position within an area of a full circle which has almost the same area as the primary disk 20. As a result, the physical position of the mounting part 4 with respect to the carrier 6 can be changed within limits in all six degrees of freedom. Because of the mathematically relatively complex relationship between an adjusting position of the mounting part 4 in a reference system fixed to the reference system which is predetermined rotatorily and translatorily in three axes and because of the thus required angular adjustments of the individual primary and secondary disks 20, 26, it is recommended that the angular positions of all individual disks 20, 26 of all three adjusting units 2 and the corresponding physical adjusting position of the mounting part 4 be correlated with one another in a computer-assisted manner.

The releasable anchoring of the adjusting units 2 on the carrier 6 offers the possibility of removing the double disk arrangements 20, 26 together with the connecting parts 8, 36 after the adjusting of the mounting part 4 and to exchange them in each case for a one-piece fastening plate which is manufactured with precise measurements according to the relative position of the connecting parts 8, 36 and which is mounted on the end of the carrier 6 in a manner that is identical to the mounting of the double disk arrangement 20, 26. However, in applications where the adjusting position of the mounting part 4 with respect to the carrier 6 must be changed or corrected subsequently, the adjusting units remain on the carrier for the final fastening of the mounting part 6 in order to permit a readjustment, perhaps by remote control by means of the pinion driving motors.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for adjusting a mounting part on carrier in a statically determined position adjustable in three axes in a rotatory and translatory manner with respect to the carrier, the arrangement comprising:
   at least three adjusting units arranged in an offset manner with respect to one another between the carrier and the mounting part, each of said adjusting units including two connecting parts translatorily adjustable in two axes with respect to one another, said adjusting units being constructed freely movable rotatorily in three axes and translatorily in one axis in a sloped manner to the adjusting plane of the two connecting parts;
   a double disk arrangement adjustably coupling the two connecting parts with one another in two axes, said double disk arrangement including a primary disk disposed on one connecting part in an adjusting plane of the two connecting parts so that the rotating position can be adjusted and, a secondary disk, enclosed by the primary disk, and disposed so that its rotating position on the primary disk can be adjusted about an axis (B) eccentric to its axis of rotation (A);
   wherein the other connecting part is arranged on the secondary disk at a distance (a) from the axis of rotation (B) of the secondary disk.

2. An arrangement according to claim 1, wherein the secondary disk is arranged on the primary disk and, the primary disk is arranged on one connecting part in a rotatable manner in each case via a bearing which encloses the outer circumference of the disk in a ring-shaped manner.

3. An arrangement according to claim 1, wherein, between the primary disk and the one connecting part and between the two disks, a positive connection is provided which acts on both sides along the whole exterior edge of the disks.

4. An arrangement according to claim 2, wherein, between the primary disk and the one connecting part and between the two disks, a positive connection is provided which acts on both sides along the whole exterior edge of the disks.

5. An arrangement according to claim 1, wherein the secondary disk is disposed in the disk plane of the primary disk so that it can be rotated on it.

6. An arrangement according to claim 1, wherein the distance (a) between the axis of rotation (B) of the secondary disk and the connecting part arranged on it is essentially equal to the eccentricity (e) of the axes of rotation of the disks.

7. An arrangement according to claim 2, wherein the distance (a) between the axis of rotation (B) of the secondary disk and the connecting part arranged on it is essentially equal to the eccentricity (e) of the axes of rotation of the disks.

8. An arrangement according to claim 1, wherein the double disk arrangement can be removed and exchanged for an end-mounted fastening unit which is manufactured with precise measurements according to the relative position of the connecting parts in the adjusting position of the double disk arrangement.

9. An arrangement according to claim 1, wherein the adjusting units are provided while the double disk arrangement is non-rotatably locked in the adjusting position for a final fastening of the mounting part on the carrier.

10. An arrangement according to claim 9, wherein the double disk arrangements can be readjusted in the final mounting condition.

11. An arrangement according to claim 1, wherein the double disk arrangements are driven by a motor so that the rotating position can be adjusted.

12. An arrangement according to claim 2, wherein the double disk arrangements are driven by a motor so that the rotating position can be adjusted.

13. An arrangement according to claim 10, wherein the double disk arrangements are driven by a motor so that the rotating position can be adjusted.

14. An arrangement according to claim 1, wherein one connecting part is directly fastened on the carrier in a rigid manner and the other connecting part is arranged on a combined ball joint slide connection with slide pins which are rigidly fastened on the mounting part.

15. An arrangement according to claim 2, wherein one connecting part is directly fastened on the carrier in a rigid manner and the other connecting part is arranged on a combined ball joint slide connection with slide pins which are rigidly fastened on the mounting part.

16. An arrangement according to claim 13, wherein one connecting part is directly fastened on the carrier in a rigid manner and the other connecting part is arranged on a combined ball joint slide connection with slide pins which are rigidly fastened on the mounting part.

17. An arrangement according to claim 1, wherein the sliding axes of the individual adjusting units, which are in each case provided for the free translation movement, have a common intersecting point (P).

18. An arrangement according to claim 1, wherein the rotating position adjusting movements of the primary and secondary disks of the adjusting units are coordinated in a computer-assisted manner.

19. An arrangement according to claim 2, wherein the rotating position adjusting movements of the primary and secondary disks of the adjusting units are coordinated in a computer-assisted manner.

20. An arrangement according to claim 16, wherein the rotating position adjusting movements of the primary and secondary disks of the adjusting units are coordinated in a computer-assisted manner.

* * * * *